United States Patent [19]

Beck

[11] Patent Number: 4,663,814

[45] Date of Patent: May 12, 1987

[54] PROPELLER PULLER APPARATUS

[76] Inventor: David W. Beck, 2257 Gaylord St., Long Beach, Calif. 90813

[21] Appl. No.: 797,162

[22] Filed: Nov. 12, 1985

[51] Int. Cl.[4] .................... B23P 19/04

[52] U.S. Cl. .................... 29/240; 29/426.5; 29/264; 29/281.6; 403/16

[58] Field of Search .................... 29/426.5, 256, 264, 29/266, 259, 281.6, 283, 257, 240; 403/12, 16, 19, 7

[56] References Cited

U.S. PATENT DOCUMENTS

| | | | |
|---|---|---|---|
| 573,323 | 12/1896 | Drysdale | 29/259 |
| 1,538,721 | 5/1925 | Merdian | 29/259 |
| 1,575,517 | 3/1926 | Albright et al. | 29/259 |
| 1,865,420 | 6/1932 | Kick | 29/256 |
| 1,956,924 | 5/1934 | Kulp et al. | 29/259 |
| 2,030,006 | 2/1936 | Kelly | 29/264 X |
| 2,913,817 | 11/1959 | Barre, Jr. et al. | 29/266 X |

FOREIGN PATENT DOCUMENTS

| | | | |
|---|---|---|---|
| 457769 | 9/1913 | France | 403/16 |

*Primary Examiner*—Charlie T. Moon
*Attorney, Agent, or Firm*—Fulwider, Patton, Rieber, Lee & Utecht

[57] ABSTRACT

A method and apparatus for removing a propeller hub secured by a nut to a tapered drive shaft. A puller abutment is fixed to the hub in position to engage the nut and prevent axial movement of the nut relative to the hub. Rotation of the nut against the axially immovable abutment results in axial movement of the hub, nut and abutment relative to the shaft, separating the hub from the shaft. Continued rotation of the nut separates the hub and nut from the shaft.

4 Claims, 9 Drawing Figures

PROPELLER PULLER APPARATUS

BACKGROUND OF THE INVENTION

1. Field of the Invention

The present invention relates to a apparatus for removing or pulling a propeller hub from a drive shaft, and more particularly for removing the hub of a folding propeller assembly from a drive shaft.

2. DESCRIPTION OF THE PRIOR ART

Folding propellers for sailboats and similar craft are attached to the propeller drive shaft in a manner that is sufficiently different from the mounting of a fixed blade propeller that the means employed to remove or pull fixed blade propellers are not completely satisfactory for removing the hub of a folding propeller. The typical puller used is a coventional automobile wheel puller which comprises two or more elongated bars having inwardly directed ends to engage or hook upon the inner end of the propeller hub. The opposite ends of the bars are pivoted upon a cross member which threadably carries an elongated threaded element engageable with the propeller drive shaft.

Rotation of the threaded puller element is adapted to axially move the hub relative to the drive shaft, "popping" or separating the locking taper of the hub from the shaft.

The standard wheel puller just described is relatively unwieldy and awkward to operate, particularly since hub removal is often done with the boat in the water. However, its most serious shortcoming is that the level of separating force developed just prior to hub separation is so great that the release of this force upon separation is sudden, often resulting in rapid outward axial movement of the hub. If the person pulling the hub is startled or made apprehensive by the sudden hub separation, he may not catch the separated hub and it will drop to the sea bottom along with the puller.

SUMMARY OF THE INVENTION

According to the apparatus of the present invention, the hub holding nut of a folding propeller assembly is itself used to effect separation of the hub from the shaft. After the folding propeller blades are removed, along with the cotters or keys which keep the nut from rotating relative to the hub, a puller abutment having a pair of axially extending channels is located in engagement with the nut. The blade mounting projections of the hub are received in these channels, and means are provided to fixedly connect the hub projections to the abutment so that the abutment cannot move axially relative to the hub.

Rotational backing off of the nut urges it against the axially immovable abutment such that relative axial movement occurs between the hub and the shaft, separating or "popping" the hub from the shaft.

It is important to note that on hub separation the nut is still threaded upon the shaft so that is keeps the hub from completely separating from the shaft. Such complete separation is possible only upon continued rotation of the nut to free it from the shaft.

In one embodiment of the invention, the puller abutment includes an axially extending passageway through which a wrench means such as a socket drive can be disposed for turning of the nut. In addition, the puller abutment is fixed to the hub by headed shafts or pins which extend through transverse openings in the abutment and into the transverse openings which are provided in the hub for the pivot pin which mounts the folding propeller blades.

DESCRIPTION OF THE PREFERRED EMBODIMENT

Figure 1:
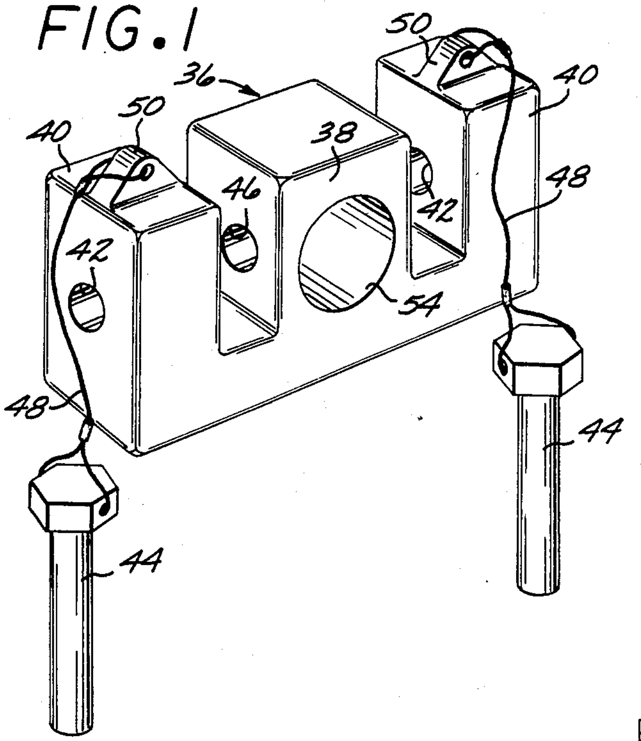
FIG. 1 is a perspective of a puller abutment according to the present invention.
Figure 2:
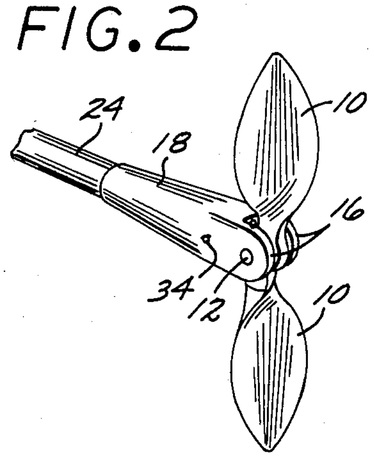
FIG. 2 is a perspective view on a reduced scale showing a folding propeller system comprising a hub rotatably mounting a pair of folding propeller blades.
Figure 3:
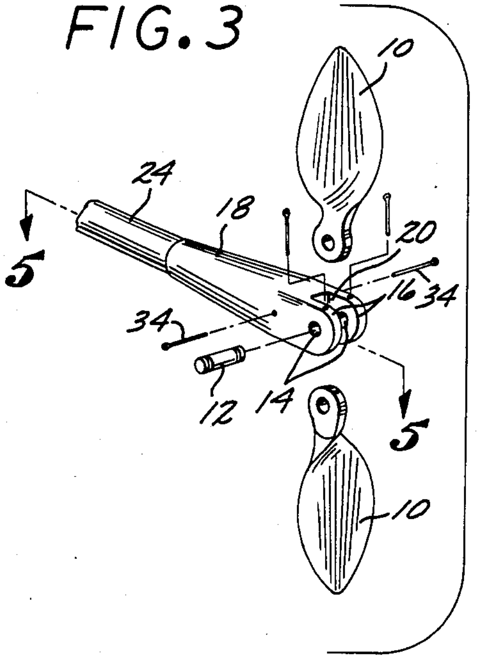
FIG. 3 is a view similar to FIG. 2, but illustrating the folding propeller blades, pivot pins, and cotters removed.

Referring now to the drawings, and particularly to FIGS. 2 and 3, a prior art folding propeller assembly is illustrated which comprises, generally, a pair of propeller blades 10 which are each pivotally carried at the heel or inner end by a transverse pivot pin 12 which is carried at its opposite extremities within a pair of aligned transverse openings 14 provided in a pair of hub ears or projections 16.

The projections 16 constitute integral portions of a propeller hub 18. The space or recess between the projection 16 which receives the inner ends of the propeller blades 10 is indicated at 20.

Figure 5:
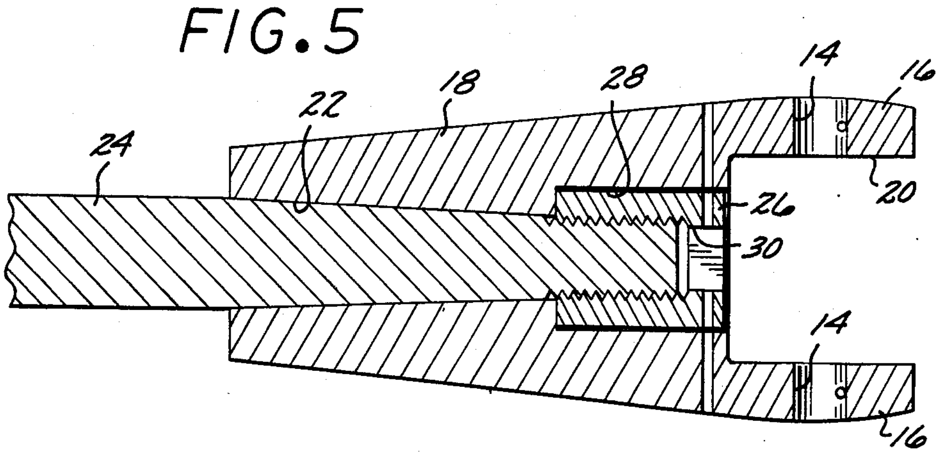
FIG. 5 is an enlarged cross sectional view taken along the line 5—5 of FIG. 3.

As best seen in FIG. 5, the hub 18 includes a central bore 22 complementally tapered to closely fit upon a tapered drive shaft 24. The shaft 24 includes a threaded extremity, and a nut 26 rotatable within a counterbore 28 in the hub 18 is threaded upon the drive shaft extremity to retain the hub 18 in position upon the shaft 24.

Figure 4:
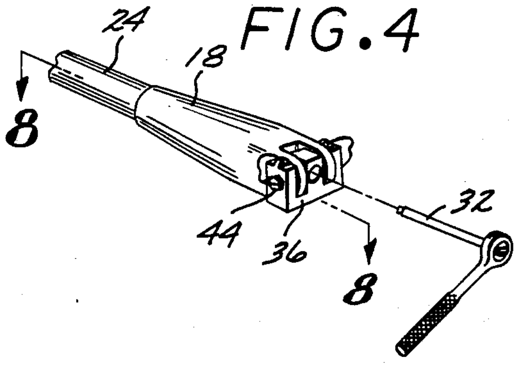
FIG. 4 is a view similar to FIG. 3, but illustrating the puller abutment in operative position after removal of the folding propeller blades, pivot pin and cotter keys.
Figure 6:
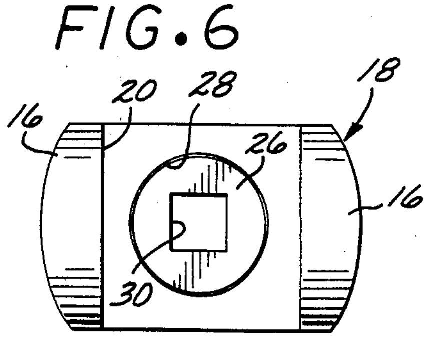
FIG. 6 is an enlarged end elevational view of the propeller hub of FIG. 3.
Figure 7:
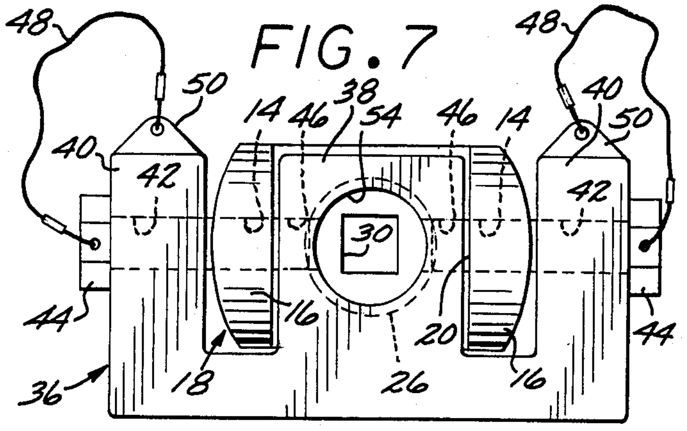
FIG. 7 is a view similar to FIG. 6, but illustrating the puller abutment in the operative position of FIG. 4.

The nut 26 includes wrench receiving means in the form of a cavity 30 having wrench receiving means such as flats or the like to accept a wrench such as a socket drive 32, as seen in FIGS. 4 and 6. A pair of cotters or keys, as seen in FIG. 3, are normally inserted through suitable aligned openings in the hub 18 and nut 26, as seen in FIG. 5, and their ends are spread within the cavity 30 to retain them in position so that the nut 26 is fixed against rotational movement relative to the hub 18.

Referring now to FIGS. 1, 4 and 6 through 9, there is illustrated a puller apparatus which is operative to quickly remove the hub 18 from the shaft 24 in a contolled manner such that the separated hub 18 is not likely to be lost.

Figure 8:
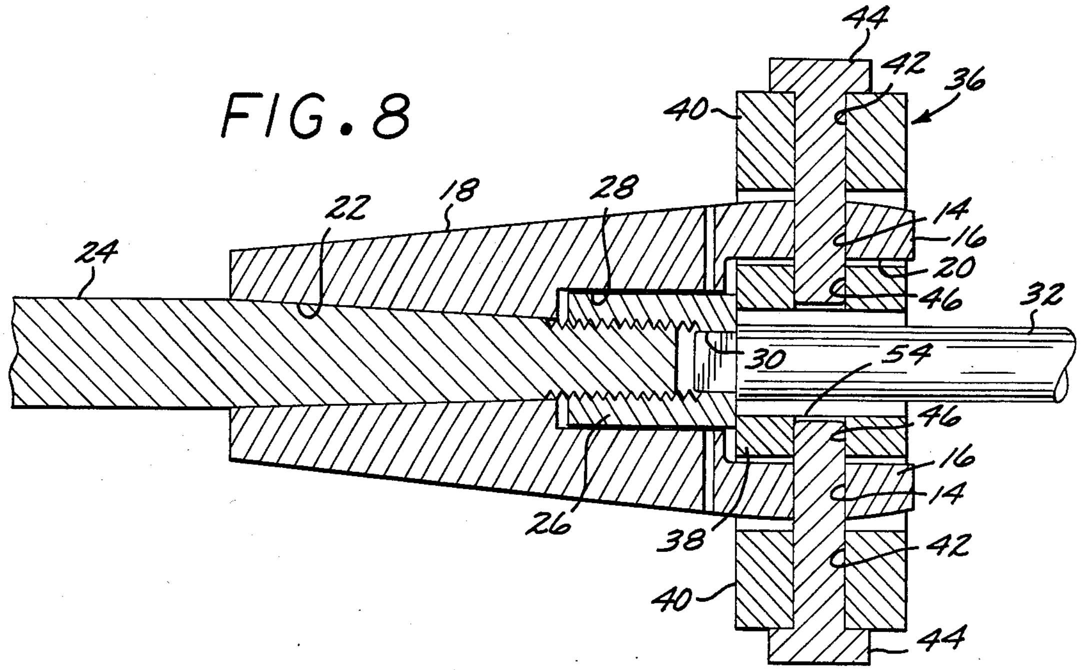
FIG. 8 is an enlarged view taken along the line 8—8 of FIG. 4, the hub being illustrated in mounted position upon the drive shaft.
Figure 9:
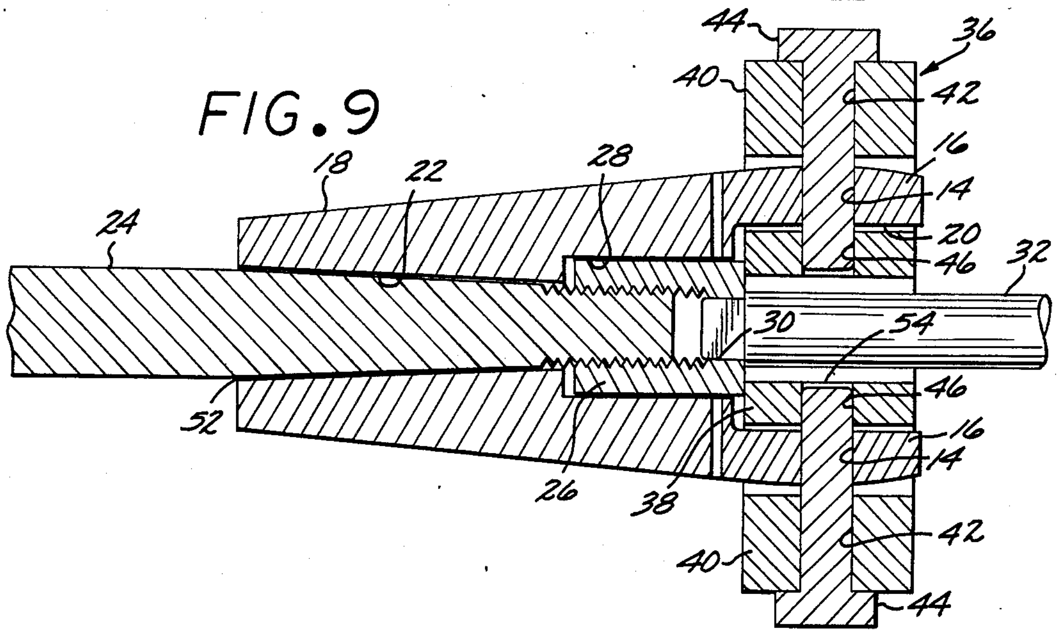
FIG. 9 is a view similar to FIG. 8, but illustrating the relative positions of the hub and shaft just after separation.

The first step in the hub separation procedure removal of the pivot pin 12 from the hub projections 16 to free the propeller blades 10 for removal. The cotters 34 are next removed and the remaining structure is as illustrated in FIG. 5. The nut 26 should next be backed off a couple of turns to make it more easily rotatable, as seen in FIG. 8.

The puller apparatus comprises a puller abutment 36 having a central portion 38 adapted to fit within the recess 20 in engagement with the nut 26 to constrain the nut 26 against outward axial movement relative to the hub 18. The puller abutment 36 also has a pair of side portions 40 adapted for location adjacent and laterally outwardly of the hub projections 16. The side portions 40 include aligned transverse openings 42 which align with the transverse openings 14 of the hub projections 16.

A pair of headed cylindrical shafts or pins 44 extend through the transverse openings 42 of the side portions 40 and into the transverse openings 14 of the hub projections 16 to constrain the hub 18 and abutment 36 against axial movement relative to one another. Aligned transverse openings 46 are preferably also provided in the puller abutment central portion 38 in alignment with the transverse openings 42 for receipt of the inner ends of the pins 44. This provides maximum structural integrity.

The heads of the pins 44 are each apertured to receive one end of a flexible cable, lanyard or keeper 48 which is secured at its other end through an aperture in a tab 50 integral with the associated abutment side portion 40. This prevents loss of the pins 44 during use of the puller apparatus.

With the nut 26 engaged upon the adjacent extremity of the abutment central portion 38, a backing off rotation of the nut 26 will develop a separating force tending to axially move or "pop" the hub 28. This separation is somewhat exaggerated in FIG. 9, being illustrated as a space at 52.

Use of the socket drive 32 fitted within the cavity 30 of the nut 26 is one suitable method for rotating the nut 26 to effect the desired hub separation. An axially directed bore or passageway 54 is provided in the puller abutment central portion 38 to afford access to the nut 26 by the socket drive 32.

When separation of the hub 18 from the shaft 24 occurs, there is no possibility for the hub 18 to accidentally drop off the shaft 24 because the nut 26 remains threadably attached to the shaft 24. It is only after further deliberate rotation of the nut 26 that the hub 18 can be completely separated from the shaft 24, together with the nut 26 and the puller abutment 36 and the pins 44. Thus, when the hub 18 is being removed with the boat in the water, inadvertent dropping of the separated components to the sea bottom is much less likely to happen.

If desired, the puller apparatus can first be removed from the hub 18 before the nut 26 is completely backed off to remove the hub 18.

Although it is conceivable that a puller abutment could be utilized having only a single side portion and pin, it is preferred to use the described pair of side portions and associated pins 44 for improved structural integrity and better stress distribution.

The described method of separating the hub 18 from the drive shaft 24 thus comprises the step of fixing the puller abutment 36 to the hub 18 to constrain the nut 26 against outward axial movement relative to the hub 18. This can be done in any suitable fashion, such as by means of the pins 44. This is followed by the step of rotating the nut 26 relative to the shaft 24 and the hub 18 to axially move and separate the hub 18 from the shaft 24. The additional step of continued rotation of the nut 26 will then result in complete separation of the hub 18, nut 26 and puller abutment 36 from the shaft 24. Alternatively, the puller abutment 36 can be detached prior to removal of the nut 26 and hub 18.

The apparatus of the invention thus quickly and easily separated a propeller hub from a propeller drive shaft without the problems posed by the abrupt hub separation typical of prior art hub pullers. The apparatus is particularly suited for removing the propeller hub of a folding propeller assembly, the nut securing the hub to the shaft itself being used to develop the separating force.

Various modification and changes may be made with regard to the foregoing detailed description without departing from the spirit of the invention.

I claim:

1. A puller apparatus useable with a wrench for removing a propeller hub from a tapered drive shaft having a threaded extremity, wherein said propeller hub includes a central bore complementally tapered to closely fit upon said tapered drive shaft; a counterbore rotatably seating a nut threaded upon said extremity and characterized by wrench receiving means internal of said nut; and a pair of integral projections spaced apart to define a recess adjacent said counterbore, said projections including transverse openings, said apparatus comprising:

- a puller abutment including a central portion adapted to fit within said recess in engagement with said nut to constrain said nut against outward axial movement relative to said hub, said abutment further including a pair of side portions outwardly spaced from said central portion to define channels for receiving said projections adapted for location adjacent said projections of said hub and having transverse openings adapted for alignment, respectively, with said transverse openings in said projections; and
- a pair of pin means for extension through said transverse openings of said side portions and into said transverse openings of said projections to constrain said hub and said abutment against axial movement relative to one another whereby rotation of said nut upon said shaft by said wrench engaged upon said wrench receiving means tends to urge said nut against said abutment and axially move said hub relative to said shaft.

2. A puller apparatus according to claim 1 wherein said central portion includes an axially directed passageway to afford access to said wrench receiving means.

3. A puller apparatus according to claim 1 and including flexible attachment means connecting said pair of pin means to said abutment to prevent separation from said abutment upon removal of said pair of pin means from said transverse openings in said side portions.

4. A puller apparatus according to claim 1 wherein said central portion includes transverse openings aligned with said transverse openings in said side portions for receiving the inner extremities of said pair of pin means.

* * * * *